Jan. 1, 1963  K. C. MATHEWS  3,071,703
MAGNETIC SIGNALLING DEVICE
Filed June 1, 1959  2 Sheets-Sheet 1

INVENTOR.
KENNETH C. MATHEWS
BY

Jan. 1, 1963 K. C. MATHEWS 3,071,703
MAGNETIC SIGNALLING DEVICE
Filed June 1, 1959 2 Sheets-Sheet 2

INVENTOR.
KENNETH C. MATHEWS
BY

United States Patent Office 3,071,703
Patented Jan. 1, 1963

3,071,703
MAGNETIC SIGNALLING DEVICE
Kenneth C. Mathews, 19 Pequot Road, Wayland, Mass.
Filed June 1, 1959, Ser. No. 817,275
6 Claims. (Cl. 310—111)

My invention relates in general to magnetic signalling devices and in particular to an improved magnetic rotary transducer which generates an amplitude modulated alternating voltage or current related in amplitude to shaft angular positions.

There are many well known devices of this type such as the synchro and the E-pickoff as described in volume 25 of the Radiation Laboratory Series, McGraw-Hill, 1947. The present invention is a high accuracy improved signalling device which permits continuous mechanical rotation and can be adapted to provide any one of a variety of relationships between output voltage (or current) amplitude and shaft angular position without mechanical contacts of any kind between rotor and stator for the purpose of carrying current. The selected functional relationship between output voltage amplitude and shaft angular position can be made to hold over the complete shaft angular range of 0° to 360°. A specific example is the resolver adaptation of the improved magnetic signalling device in which one output voltage amplitude is proportional to the sine of the shaft rotation angle and another output voltage from the same device is proportional to the cosine of the shaft angle. A second specific example is the synchro adaptation of the improved magnetic signalling device in which three output voltages are provided, each proportional in amplitude to the sine of the shaft rotation angle but each displaced 120° in mechanical angle from the next. Both the resolver and synchro adaptations provide outputs as described which hold continuously over a complete revolution of the shaft.

The objects of this invention are therefore to provide an improved magnetic signalling device which has no contacts or brushes between rotor and stator and which can be adapted to provide any one of a variety of relationships between output voltage (or current) amplitude and shaft angular position, such as the resolver relationship, the synchro relationship and other linear and nonlinear relationships all holding true over very wide shaft angular position ranges. These and other objects of this invention will become apparent from the attached description and drawings, namely:

Figure 1:
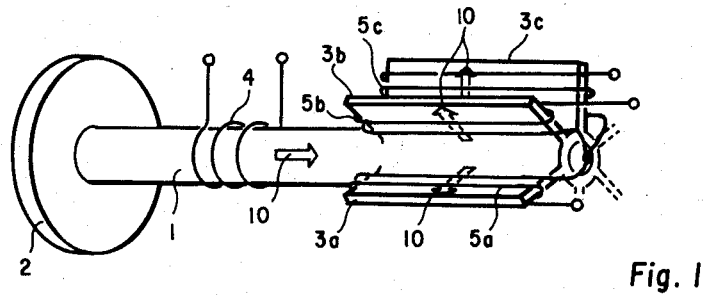
FIGURE 1 is a schematic drawing of the stator assembly.

As will be seen in FIGURE 1, the stator assembly is comprised of an axial flux tube 1 of magnetic material such as hipernik which has at one extremity a radial primary pole extension 2 in the form of a circular flange. The axial flux tube has at the opposite extremity a multiplicity of radial secondary pole extensions 3a, 3b, 3c, etc. A primary energizing winding 4 is wound over the flux tube 1 and encircling each secondary pole extension is a secondary winding 5a, 5b, 5c, etc. respectively. The stator is adapted to support the rotor by bearings or other suitable means and is also adapted to enclosure within a suitable housing, not shown.

Figure 2:
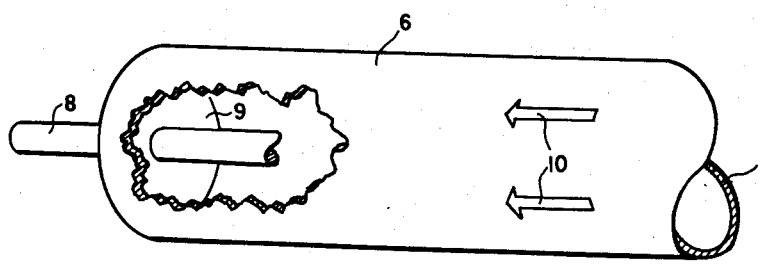
FIGURE 2 is a schematic cutaway drawing of the rotor assembly.

The rotor assembly shown in FIGURE 2 is comprised of a hollow cylinder, 6, of a similar magnetic material, terminating at one end in a suitable contour 7, which in this embodiment presents a profiling of reentrant recesses. The cylinder 6 is designed to be mounted on a shaft 8 through some means such as the flange 9. The shaft 8 is journaled by suitable means such as bearings on the stator axial flux tube 1. In the preferred configuration the cylinder 6 is concentric with the shaft 8 and with the O.D. of the secondary pole extensions 3a, 3b, 3c, etc. However an eccentric configuration may be used to slightly modify the characteristics.

Figure 3:
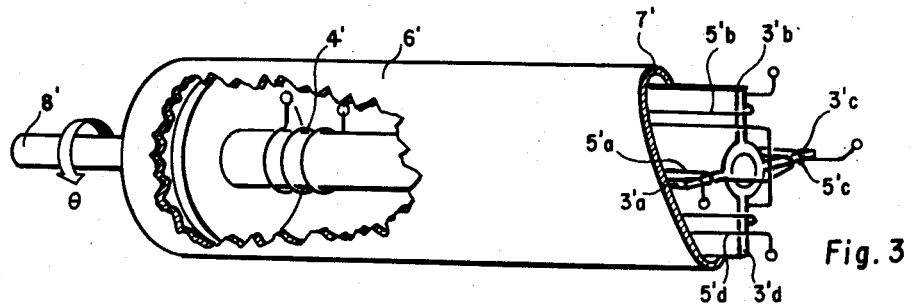
FIGURE 3 is a schematic cutaway drawing of a resolver adaptation of the improved magnetic signalling device.
Figure 4:
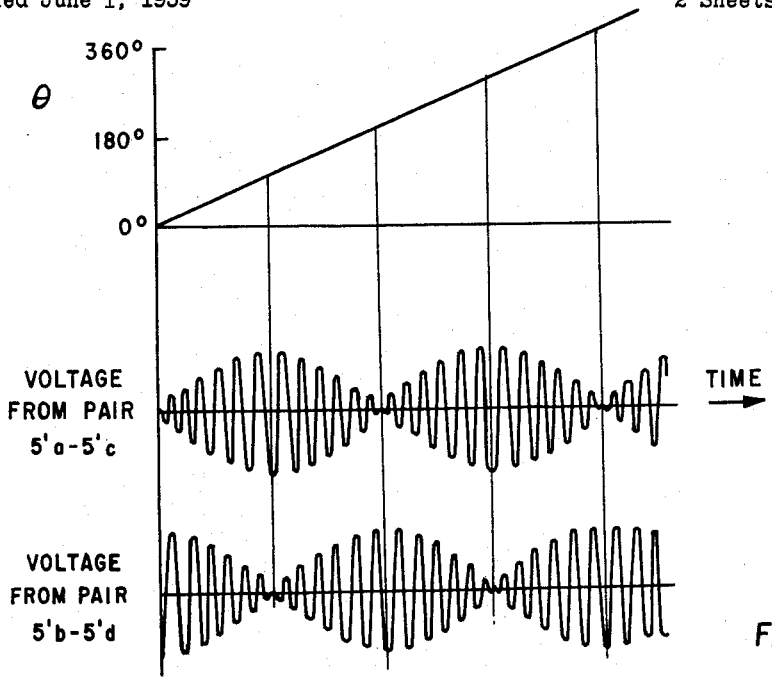
FIGURE 4 is a graph of a resolver adaptation output voltages and shaft rotation.

The resolver adaptation of the improved magnetic signalling device comprising the stator assembly parts $1'$, $2'$, $3'$, $4'$ and $5'$ and rotor assembly, parts $6'$, $7'$, $8'$ and $9'$ is shown in FIGURE 3. Exactly four radial pole extensions $3'a$, $3'b$, $3'c$ and $3'd$, equally spaced in angle, constitute the multiplicity of radial pole extensions and on these are mounted respectively four secondary windings, $5'a$, $5'b$, $5'c$ and $5'd$. In this instance the rotor end edge $7'$ is profiled with a planar cut angularly inclined with respect to the axis of the shaft $8'$ such that the overlap of any one secondary pole extension, for example $3'a$, by the rotor cylinder $6'$ is a sinusoidal function of shaft rotation angle $\theta$. The opposite secondary winding coils, pair $5'a$ and $5'c$, are connected in series opposition and similarly windings $5'b$ and $5'd$ are connected in series opposition. The primary winding $4'$ is energized with a suitable source of alternating voltage (or current) and at a particular instant of time the directions of flux in the stator and rotor are as shown in FIGURE 1 and FIGURE 2 by the arrows 10. As will be seen in FIGURE 4, the voltages appearing at the terminals of the winding pair $5'a$—$5'c$ and at the terminals of the winding pair $5'b$—$5'd$, for a constant rate of angular rotation of the rotor shaft $8'$, are sinusoidally modulated alternating voltages each voltage modulation envelope being displaced 90° of shaft rotation with respect to the other. The angular frequency of shaft rotation should be a small fraction, say $\frac{1}{10}$, of the angular frequency of the alternating voltage (or current) energizing the primary winding $4'$ to avoid modulation frequencies near or greater than carrier frequency.

Figure 5:
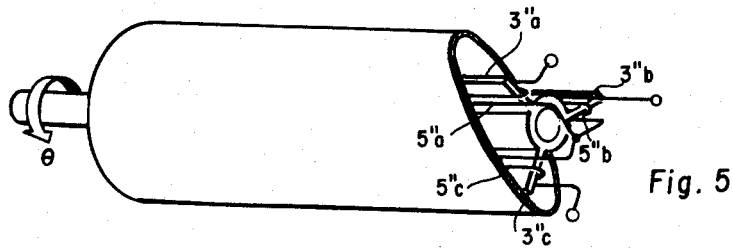
FIGURE 5 is a schematic drawing of a synchro adaptation of the improved magnetic signalling device, and, FIGURE 6 is a schematic drawing of a linear adaptation of the improved magnetic signalling device.

As will be seen in FIGURE 5 the synchro transmitter adaptation of the improved magnetic signalling device is similar in all respects to the resolver adaptation shown in FIGURE 3 with the three exceptions that there are in the case of the synchro three radial pole extensions, $3''a$, $3''b$ and $3''c$ equally spaced in angle and three corresponding secondary windings, $5''a$, $5''b$ and $5''c$ and a Y-interconnection of these secondary windings such that the voltage appearing across any two of the three free winding terminals will be sinusoidally modulated by a constant rate of shaft rotation and this modulation envelope will be displaced 120° of shaft rotation with respect to the modulation envelope of the voltage appearing across any other two of the three free terminals. The improved synchro transmitter can therefore be connected to a synchro receiver or control transformer in exactly the same way as a conventional synchro transmitter with substantially the same result.

Figure 6:
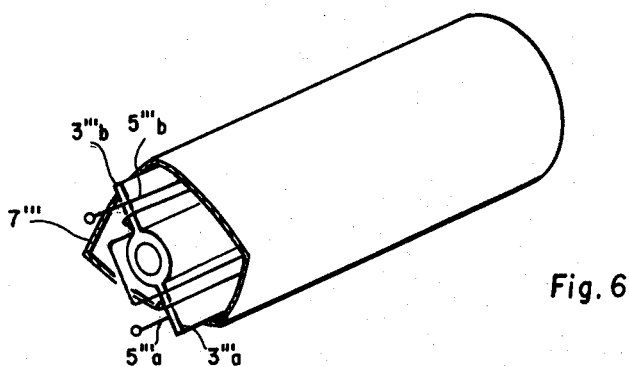

As will be seen in FIGURE 6, the linear adaptation of the improved magnetic signalling device is similar to the improved resolver shown in FIGURE 3 with the exceptions that the improved linear device rotor terminates in a contour $7'''$ consisting of two helices of equal but opposite pitch each continued through an angle of 180° such that vertices are formed at the confluences of the leading and trailing ends of both helices, and the stator has two diametrically opposite radial pole extensions $3'''a$ and $3'''b$ and two corresponding secondary windings $5'''a$ and $5'''b$ connected in series opposition such that the voltage appearing across the two free secondary terminals will be linearly modulated by a constant rate of shaft rotation. This linear modulation will actually be a periodic triangular modulation repeating every 360° of shaft rotation.

It is evident that many modifications in the foregoing descriptions could be made without changing the substance or scope of this invention. As examples of some such typical changes I cite:

Inside-out construction in which the stator encloses the rotor and in which the stator secondary pole extensions are directed radially inward;
Modification of the circular flange 2 to a sector of a circular flange.

Consequently, it is desired that the foregoing descriptions be interpreted in an illustrative sense and that I be limited only by the following claims.

I claim as my invention:

1. A magnetic signalling device comprising a stator of magnetic material, said stator having at one extremity four radial pole extensions equally spaced in angle with reference to each other and at the other extremity a radial flange, said radial pole extensions and said flange being connected by an axial tube, a primary energizing winding encircling said axial tube, a secondary winding encircling each said radial pole extension, said secondary windings connected to provide resolver operation, a rotor consisting of a cylinder of magnetic material concentric with said stator, said cylinder terminating at one axial extremity in a planar cut inclined at an angle with respect to the said cylinder axis and disposed to cooperate magnetically with said radial pole extensions, a shaft affixed to said rotor for angular positioning of said rotor and means for journaling said shaft on said stator.

2. A magnetic signalling device comprising a stator of magnetic material, said stator having at one extremity three radial pole extensions equally spaced in angle with reference to each other and at the other extremity a radial flange, said radial pole extensions and said flange being connected by an axial tube, a primary energizing winding encircling said axial tube, a secondary winding encircling each said radial pole extension, said secondary windings connected to provide synchro transmitter operation, a rotor consisting of a cylinder of magnetic material concentric with said stator, said cylinder terminating at one axial extremity in a planar cut inclined at an angle with respect to the said cylinder axis and disposed to cooperate magnetically with said radial pole extensions, a shaft affixed to said rotor for angular positioning of said rotor, and means for journaling said shaft on said stator.

3. A magnetic signalling device comprising a stator of magnetic material, said stator having at one extremity two radial pole extensions diametrically opposed an at the other end a radial flange, said radial pole extensions and said radial flange being connected by an axial tube, a primary energizing winding encircling said axial tube, a secondary winding encircling each said radial pole extension, said secondary windings being connected in a series opposition, a rotor consisting of a cylinder of magnetic material concentric with said stator, said cylinder terminating at one axial extremity in a contour consisting of two helices of equal but opposite pitch each said helix continued through an angle of 180°, said contoured cylinder extremity disposed to cooperate magnetically with said radial pole extensions, a shaft affixed to said rotor for angular positioning of said rotor, and means for journaling said shaft on said stator.

4. A magnetic signalling device, comprising a stator and a rotor, said stator including first means providing a magnetically susceptible path and second means providing a plurality of radially arranged magnetically susceptible elements, a first winding disposed on said stator, a plurality of second windings about said elements of said second means, said rotor including third means providing a plurality of magnetically susceptible increments providing a flux return between said first means and said second means, said magnetically susceptible increments being of a different character.

5. A magnetic signalling device according to claim 4 wherein said first means includes a shaft, said second means includes a plurality of evenly distributed pole pieces extending radially from said shaft and said third means includes a tubular rotor coaxially mounted about said shaft and having an end portion arranged in spaced facing relation to the ends of said pole pieces, said end portion being profiled to vary said flux return upon a relative movement thereof.

6. A magnetic signalling device comprising a stator of magnetic material, said stator having a plurality of radial pole pieces, primary windings mounted on said stator and adapted to be connected to a source of alternating current, secondary windings mounted on each of said pole pieces, a tubular cylindrical rotor of magnetic material generally concentric with said stator and providing a flux return path from at least one of said pole pieces to at least another of said pole pieces when said primary windings are energized, said rotor having an end portion located adjacent said pole pieces and having a circumferential profile adapted to modulate the voltage induced in said secondary windings upon a relative displacement between said pole pieces and said rotor.

References Cited in the file of this patent

UNITED STATES PATENTS

| | | |
|---|---|---|
| 2,774,895 | Zuckermann | Dec. 18, 1956 |
| 2,820,915 | Mathews | Jan. 21, 1958 |
| 2,842,729 | Hillman | July 8, 1958 |

FOREIGN PATENTS

| | | |
|---|---|---|
| 337,699 | Great Britain | Nov. 6, 1930 |